Nov. 20, 1962 R. P. FICAT ETAL 3,064,645
DAMPED PROSTHESIS FORMING A SUBSTITUTE FOR THE
COXO-FEMORAL ARTICULATION
Filed Jan. 15, 1962 3 Sheets-Sheet 3
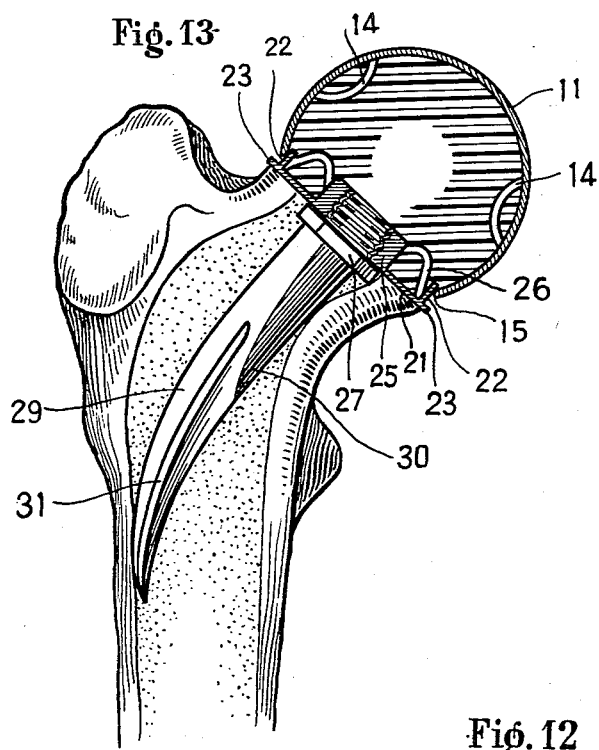
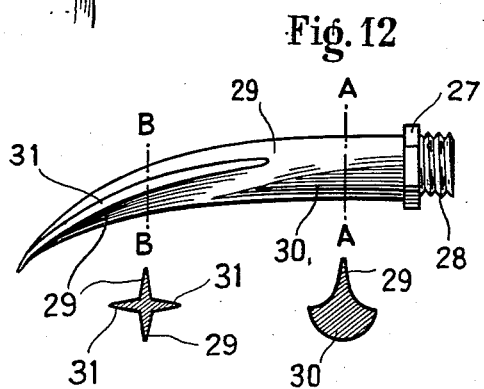
INVENTORS
RAYMOND PAUL FICAT
JEAN RAYMOND RENE GUENOT
BY Irwin S. Thompson
ATTY.

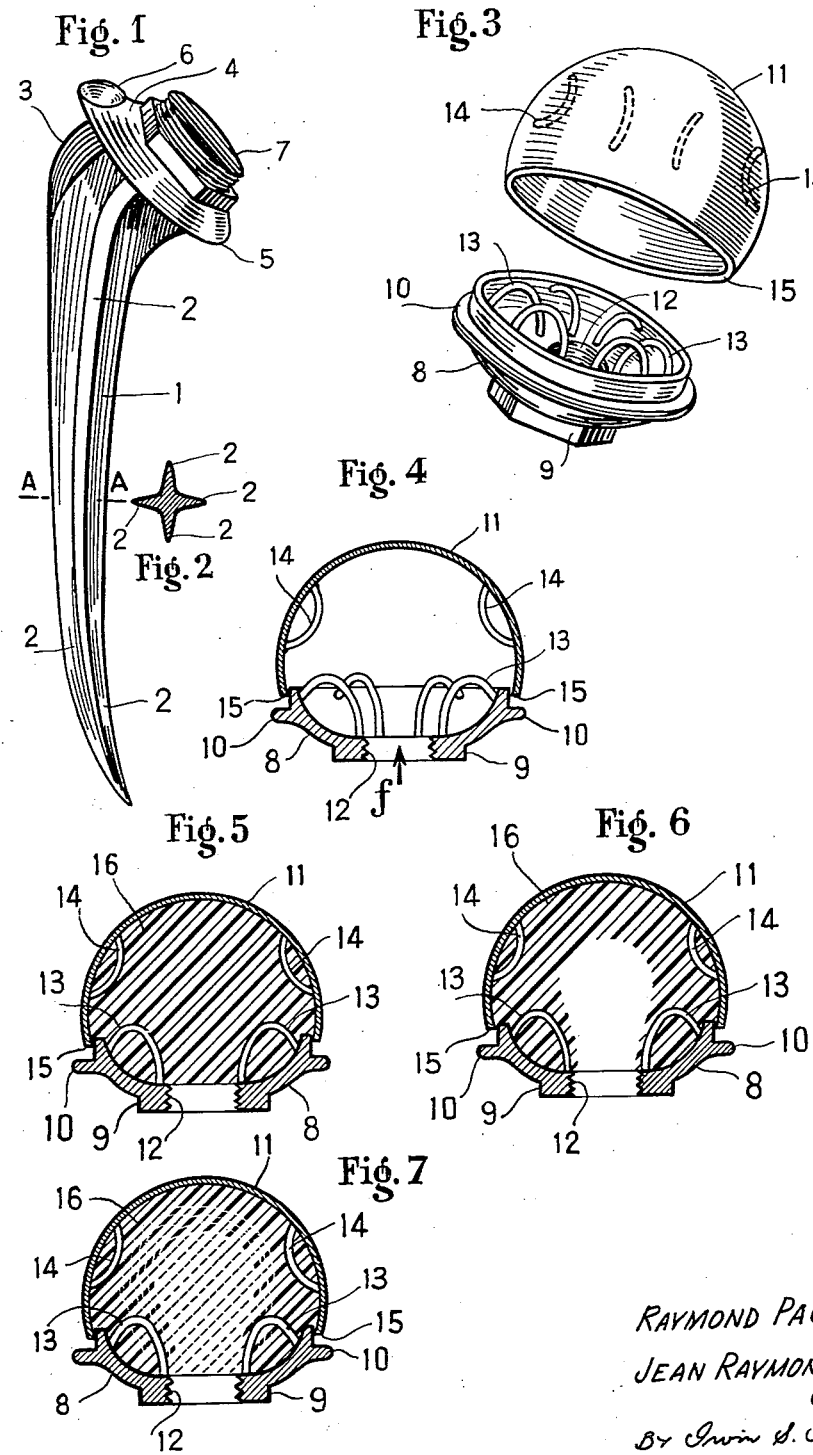

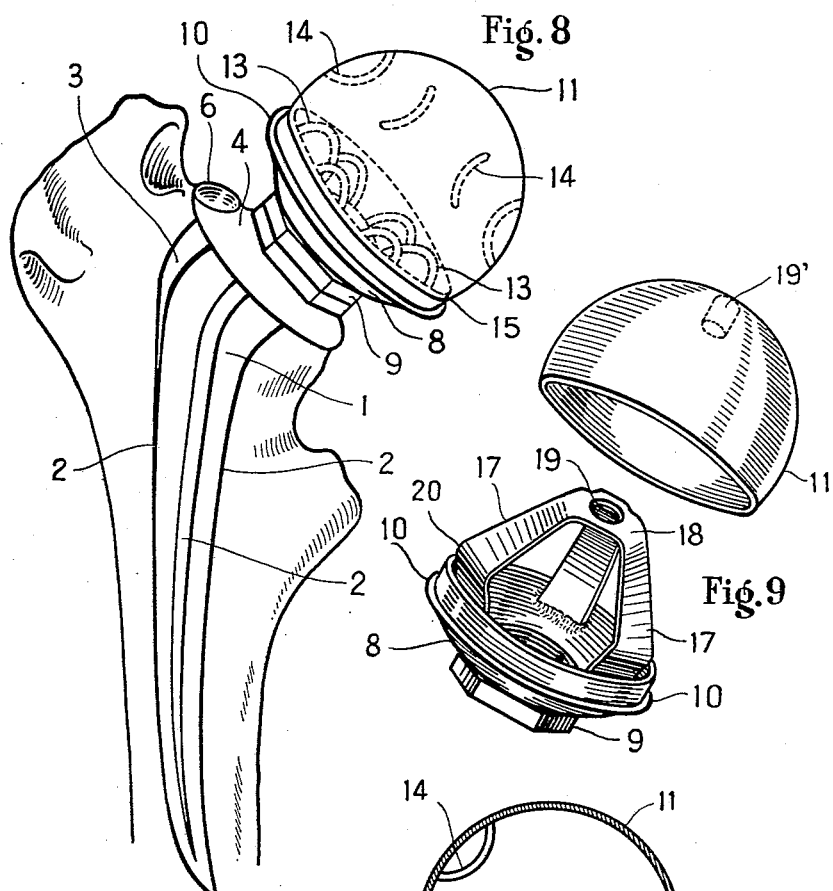
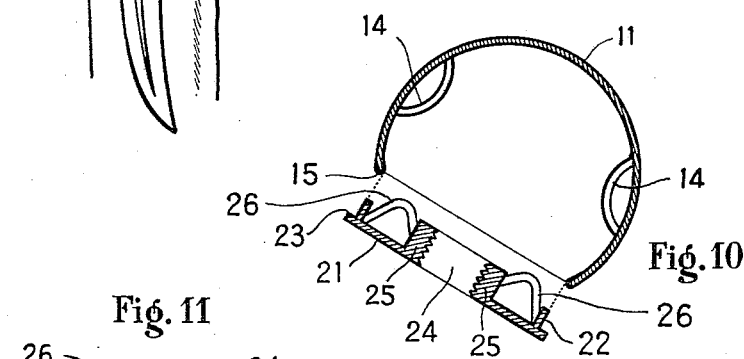
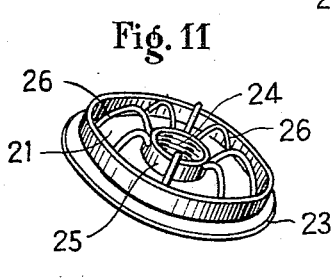

3,064,645
DAMPED PROSTHESIS FORMING A SUBSTITUTE FOR THE COXO-FEMORAL ARTICULATION
Raymond P. Ficat, 4, Rue Jean Suau, and Jean R. R. Guenot, Place Commerciale Jolimont, Toulouse, Haute-Garonne, France
Filed Jan. 15, 1962, Ser. No. 166,219
Claims priority, application France Jan. 23, 1961
16 Claims. (Cl. 128—92)

Our invention has for its object a damped prosthesis adapted to replace either the head of the femur together with a large fraction of the femur neck, or else, only the head of the femur, on as to rebuild the upper end of the femur and to not only reform accurately the morphological structure of the femur head, but also to functionally replace the cartilage.

The defect common to all prostheses known hitherto consists in that they are designed for reforming a joint or articulation by merely restoring its shape, without taking heed of its operation. Now, the part played by an articulation depends chiefly on the essential function of cartilage. Said function consists, in addition to the sliding movement which may be obtained with a perfectly polished surface formed on the prosthesis, in a damping of the pressures exerted on the joint and this should form the corner stone of any arthroplastic rebuilding.

The object of our invention consists therefore in providing a prosthesis including damping means adapted to oppose compressing, tensioning, flexional, shearing and rotary forces which are exerted on its upper end, said damping means being thus bestowed with the fundamental properties provided exclusively by cartilaginous tissue.

Taking into account that the compressing forces exerted by the bones and the muscles on the femoral head converge in the cartilage, our improved damped prosthesis acts so as to neutralize and to release the articulation at the actual location at which said neutralization and release would be obtained normally under distributing and transmitting conditions similar to those prevailing with normal cartilage.

The chief feature of our improved damped prosthesis consists in that its spherical hollow articular section includes two caps made of Stellite, assembled so as to allow a suitably limited compression, the damping means being constituted by a core made of an elastomer enclosed inside said spherical section without any contact with any living tissue.

The physico-chemical properties of the leastomers to be listed hereinafter are as follows:
 Low specific weight (1.1);
 Thermic stability within limits extending between —60° C. and +250° C., which allows a perfect sterilization in a so-called Poupinel autoclave at 160° C.;
 Remarkable electrically insulating properties;
 Chemical inertia against oxidizing reagents, bases and acids;
 Unvarying elasticity.

All these properties of elastomers are perfectly in harmony with the corresponding properties of Stellites, that is of chromium-cobalt molybdenum alloys containing no carbon, which are not oxidizable, are light and amagnetic and show a marked well-tested biological tolerance. The association of these two elastomer and Stellite materials provides thus, from a surgical standpoint, a maximum reliability. It allows furthermore obtaining prostheses, of which the weight is substantially the same as the normal weight of a femoral head.

It should be remarked that the damping means may also be consttiuted, in accordance with our invention, by springs, said last solution being however less satisfactory than that defined hereinabove.

Our improved prosthesis with a damped head ensures still further improvements in the field of arthroplastics. It includes chiefly two separate parts, to wit:
 An intra-medullar spindle-shaped part;
 A head-shaped damped articular part.

There are provided two embodiments for the spindle, of which one is elongated and is intended for a prosthesis adapted to replace a fraction of the neck of the femur, while the other embodiment is shorter and is intended for use with a prosthesis limited to the replacement of the femoral head alone. Said spindle allows, in particular in the second case, securing the prosthesis along an axis which is further more rational than the axis extending across the cervix which was resorted to hitherto.

According to our invention, the damped head is secured in the two above-mentioned cases through screwing over the spindle adapted to carry it, which allows providing interchangeable heads and also adapting the prosthesis to each particular case by resorting to a single standard type of spindle, whereas hitherto the prosthesis were constituted by a unitary part which required a much more important stock.

In the accompanying drawings illustrating our invention:
 FIGS. 1 to 9 relate to a damped prosthesis incorporating a fraction of the neck of the femur.
 FIG. 1 illustrates the intra-medullar spindle in perspective view.
 FIG. 2 is a cross-section of said spindle through line AA of FIG. 1.
 FIG. 3 is a perspective view of the two elements forming the damped head.
 FIG. 4 shows in vertical cross-section these head elements associated before injection of an elastomer into the head.
 FIGS. 5 to 7 show diagrammatically in vertical sectional view three modifications of the inner structure of the damped head after injection of the elastomr.
 FIG. 8 is a perspective view of the prosthesis when assembled and introduced into the medullar channel of the femur, the elastomer filling not being illustrated for sake of clarity of the drawings.
 FIG. 9 is a perspective view of a modification of the damped head in which the damping means are constituted by blade springs.
 FIGS. 10 to 13 relate to the short damped prosthesis replacing exclusively the femoral head.
 FIG. 10 is a vertical sectional view of the two elements adapted to be assembled so as to form the damped head.
 FIG. 11 is a perspective view of the lower end of said head.
 FIG. 12 is a side view of the short incurved spindle together with cross-sections of the latter at two characteristic predetermined points.
 Lastly, FIG. 13 is a vertical sectional view of the assembled prosthesis carrying its damping means, as inserted in the femur neck.

Turning first to the elongated damped prosthesis illustrated in FIGS. 1 and 2, it is apparent that the spindle 1, preferably made of Stellite and the length of which is suitably selected so as to allow its use in all cases which appear in practice, assumes the shape of a slightly incurved dagger having a downwardly gradually decreasing cross-section. Said cross-section illustrated in FIG. 2 is in the shape of a cross, of which the arms 2 form ribs which ensure stability of the spindle and cut out any angular movement inside the bone, which movements might lead to trouble; the spindle includes also, on its outer surface, an anchoring ridge 3 which provides a perfect securing and prevents entirely any untimely angular movement.

The upper section of the spindle 1 is rigid with an oval plate 4, the lower surface of which is perfectly flat so as to bear on the surgical cut across the femoral neck, said plate extending along an oblique plane having a suitable slope of about 50° with reference to the mean axis of the spindle.

On its upper outer surface, the plate 4 is provided with a depression 6 so as to allow engagement of the plate by the end of a tool, while the spindle is being urged into the diaphysis.

Lastly, the plate 4 carries a cylindrical tube 7 which is outwardly threaded and extends perpendicularly to the plane of said plate with which it is rigid.

Said standard arrangement may serve for any size of femur and carry indifferently any type of femoral head.

The articular part or head which is shown in its dismantled condition in FIG. 3, is made of Stellite, is also the spindle, and its shape is generally spherical. It is constituted by two spherical caps or elements. The lower element constituted by a spherical cap 8, is slightly cut off at its lower end, so as to carry a six-sided member 9, of which the tapping cooperates with the thread of the cylindrical tube 7. Said element is provided with an annular bead 10 serving as an abutment for the upper cap 11.

Inwardly, the lower cap 8 is provided with a central tapped bore 12 round which is laid a retaining reinforcement 13 formed by a sufficient number of wires which are suitably arranged so as to ensure perfect adherence with the elastomer to be injected inside the head.

The upper cap 11, the diameter of which is slightly larger than that of the cooperating lower cap 8, is constituted by a sphere cut off slightly underneath a diametrical plane, approximately at ⅝ of its diameter perpendicular to said plane.

It is also provided inwardly with retaining straps 14 which are suitably distributed along its inner surface, so as to prevent its angular shifting over the elastomer filling.

The upper articular cap 11 and the lower cap 8 thus designed are assembled in the manner illustrated in FIG. 4 with a clearance between the edge 15 of the cap 11 and the bead 10, after which they are subjected to an injection of a mass of silicon rubber 16, which injection is performed in the direction of the arrow f through the central tapped opening 12 of the six-sided member 9.

The elastomer being thus injected, is suitably held in position by the reinforcements 13 and 14, whereby the two caps 11 and 8 are suitably interconnected and this elastomer, by reason of its elasticity, ensures a perfect damping action, the stresses to which the prosthesis is subjected being absorbed along the periphery connecting the two caps, as allowed by the clearance provided between the edge 15 and the bead 10, which latter serves for limiting the compression.

The inner structure of the injected damped head may assume various shapes which are defined by the fillings, which are variable as required by the weight of the patient; for instance, we may use:

A so-called compact or solid head, as described hereinabove and as illustrated in FIG. 5, the damping being performed along the line of connection between the two caps;

A compound compact head, as illustrated in FIG. 7, in which the filling is not uniform, by reason of the central section being subjected to expansion by introduction of gas so as to form at said location a recessed cellular structure, said arrangement providing also an increased elasticity.

The assembly of the prosthesis through the screwing of the six-sided part over the tube 7 and the insertion of the spindle 1 inside the femoral channel, are illustrated in FIG. 8.

FIG. 9 illustrates a modification of the damping device constituted, in the case considered, by blade springs 17 forming a perforated hood which may be obtained as a unitary member through cutting. Said hood includes at its upper end a spherical cap 18 provided with a central opening 19 registering with a central guiding stud 19' provided, in the case of said modification, on the inner surface of the upper cap 11.

The blades 17 have an outline which is suitably designed and does not match exactly the inner shape of the cap 11 adapted to cover them, so as to allow the expansion of the springs inside the cap, the impact areas engaging the cap 18 being constituted by a bulging section 20 provided on said springs at the lower end of the perforated hood.

The damping action of said springs is the same as that provided by the elastomer packing, the action of which is however clearly better than that obtained with a metal spring arrangement.

As mentioned hereinabove, our invention provides the application of the damped head also on a short prosthesis serving for a rebuilding limited strictly to the femoral head.

Said prosthesis has been produced as disclosed, with the obvious intention of cutting out any important crippling resection of the bone when such a resection is not essential. The use of such a reduced prosthesis may therefore be resorted to frequently and to a large extent. The statistic data obtained show eloquently the value of this idea.

The head prosthesis according to our invention provides a substantial improvement with reference to the conventional means resorted to hitherto, chiefly because it includes a damped head, as mentioned in the above disclosure and also by reason of the improvement brought to the short incurved spindle associated with said head. Our short prosthesis is, as a matter of fact, constituted by two main parts, to wit:

A damped head constituted by two elements which are, on the one hand, an upper spherical cap similar to that already described hereinabove and, on the other hand, a supporting plate replacing the lower spherical cap resorted to in the first-mentioned prosthesis providing a replacement of the entire femoral neck;

A short incurved spindle, the structure of which differs slightly from that of the spindle adapted to carry a complete prosthesis of the first-mentioned type.

It is apparent, from inspection of FIGS. 10 to 13, that the upper spherical cap 11 cut off at a point at ⅝ of its diameter is identical with that disclosed hereinabove for the elongated prosthesis.

The lower section of the damped head of this second embodiment, is constituted, in the present case, by a circular plate 21 carrying a cylindrical ring 22 secured thereto coaxially so that the plate is provided outside said ring with a projecting annual flange 23.

The diameter of the ring 22 is equal, with a difference equal to the desired clearance, to the inner diameter of the edge of the cap 11 inside which said ring is to be inserted upon assembly of the damped head, as illustrated in FIG. 13, the flange 23 acting as a brake.

The plate 21 is provided centrally with an opening 24 surrounded by an upstanding tapped cylindrical flange 25, while the space separating the ring 22 from coaxial flange 25, is provided with a retaining reinforcement 26 similar to that shown at 13 in the preceding embodiment.

The assembly of the upper cap 11 on the flange 23 and the injection inside the head thus formed of silicone rubber through the opening 24, are also performed in the manner described hereinabove for the first embodiment, the damping means being executed in conformity with any one of the inner structures illustrated in FIGS. 5 to 7.

The spindle is given, generally speaking, the shape of an incurved dagger. It upper end is constituted by a six-sided member 27 carrying centrally a threaded stud 28, the thread on which corresponds to the tapping of the opening 24 inside which said stud is screwed, so as to ensure the complete assembly of the prosthesis.

The actual spindle which is substantially rectilinear throughout the first half of its length, is thereafter bent outwardly into a tapering curvilinear shape. It is constituted by a vertical blade 29 extending throughout the length of the actual spindle and provided with a convex longitudinal outline. Along the first substantially rectilinear half of its length, the blade 29 is provided approximately over one half of its height with a cylindrical frusto-conical reinforcement 30, of which the base engages the six-sided member 27, while its tip is located at the middle of the lower concave side of the blade 29.

The cross-section of said reinforcement 30 in the plane A—A is illustrated in FIG. 12.

Over the outer half of its length, the blade 29 carries two symmetrical orthogonal and longitudinal fins, as shown at 31, fins extending along the medial line of the blade so as to give the end of the spindle a cross-shaped cross-section in the plane B—B, as illustrated also in FIG. 12.

The mean axis of the blade 29 defines the direction to be followed during the insertion of the prosthesis inside the medullar channel of the femur neck and of the diaphysis. The cylindrical conical section of the spindle is adapted to engage the resistant portion of the lower cortical surface of the femur neck which is also termed Merkel's spur, while the convex area of the tip of the spindle is adapted to engage the upper portion of the outer cortical surface of the diaphysis.

What we claim is:

1. A prosthesis to be substituted for the coxo-femoral joint, comprising a hollow head made of Stellite and including a substantially spherical cap and a member closing same, an elastic damping filling for said head to provide a yielding fitting of the cap over the closing member and to oppose the stresses exerted on the femoral head, and a shaft rigid with the closing member and adapted to be fitted in a patient's femur.

2. A prosthesis to be substituted for the coxo-femoral joint, comprising a hollow head made of Stellite and including a substantially spherical cap and a member closing same, an elastic damping filling of silicone rubber, for said head to provide a yielding fitting of the cap over the closing member and to oppose the stresses exerted on the femoral head, and a shaft rigid with the closing member and adapted to be fitted in a patient's femur.

3. A prosthesis to be substituted for the coxo-femoral joint, comprising a hollow head made of Stellite and including a substantially spherical cap and a member closing same, a blade spring system filling for said head to provide a yielding fitting of the cap over the closing member and to oppose the stresses exerted on the femoral head, and a shaft rigid with the closing member and adapted to be fitted in a patient's femur.

4. A prosthesis to be substituted for the coxo-femoral joint, comprising a hollow head made of Stellite and including two spherical caps of which the edge of the lower cap is fitted slidingly with a very slight clearance inside the edge of the upper cap, an outer flange rigid with the lower cap at a short distance from its edge to limit the engagement of the lower cap inside the upper cap, an elastic damping filling for said head to provide a yielding fitting of the upper cap over the lower cap and to oppose the stresses exerted on the femoral head, and a shaft rigid with the lower cap and adapted to be fitted in a patient's femur.

5. A prosthesis to be substituted for the coxo-femoral joint, comprising a hollow head made of Stellite and including a substantially spherical cap extending axially over about ⅝ of the diameter of a complete sphere and a member closing same, an elastic damping filling for said head to provide a yielding fitting of the cap over the closing member and to oppose the stresses exerted on the femoral head, and a shaft rigid with the closing member and adapted to be fitted in a patient's femur.

6. A prosthesis to be substituted for the coxo-femoral joint, comprising a hollow head made of Stellite and including two spherical caps, the edge of the lower cap being fitted slidingly with a very slight clearance inside the edge of the upper cap, an outer flange rigid with the lower cap at a short distance from its edge to limit the engagement of the lower cap inside the upper cap, said lower cap incorporating a centrally tapped flattened section, a tapped projection forming an extension of said tapped section, an elastic damping filling for said head to provide a yielding fitting of the upper cap over the lower cap and to oppose the stresses exerted on the femoral head, and a shaft screwed into the tapped projection and section of the lower cap and adapted to be fitted in a patient's femur.

7. A prosthesis to be substituted for the coxo-femoral joint, comprising a hollow head made of Stellite and including a substantially spherical cap and a member closing same, an elastic damping filling for said head to provide a yielding fitting of the cap over the closing member and to oppose the stresses exerted on the femoral head, a wire reinforcement welded to the inside of the cap and closing member of the head to engage the elastic filling and thereby prevent rotation of the head with reference to the latter.

8. A prosthesis to be substituted for the coxo-femoral joint, comprising a hollow head made of Stellite and including two spherical caps, the edge of the lower cap being fitted slidingly with a very slight clearance inside the edge of the upper cap, an outer flange rigid with the lower cap at a short distance from its edge to limit the engagement of the lower cap inside the upper cap, said lower cap incorporating a centrally tapped flattened section, a tapped projection forming an extension of said tapped section and adapted to ensure the introduction of the filling into the head, an elastic damping filling for said head to provide a yielding fitting of the upper cap over the lower cap and to oppose the stresses exerted on the femoral head, and a shaft screwed into the tapped projection and section of the lower cap and adapted to be fitted in a patient's femur.

9. A prosthesis to be substituted for the coxo-femoral joint, comprising a hollow head made of Stellite and including a substantially spherical cap and a member closing same, a compact elastic damping filling of silicone rubber for said head to provide a yielding fitting of the cap over the closing member and to oppose the stresses exerted on the femoral head, and a shaft rigid with the closing member and adapted to be fitted in a patient's femur.

10. A prosthesis to be substituted for the coxo-femoral joint, comprising a hollow head made of Stellite and including a substantially spherical cap and a member closing same, a partly recessed elastic damping filling of silicone rubber for said head to provide a yielding fitting of the cap over the closing member and to oppose the stresses exerted on the femoral head, and a shaft rigid with the closing member and adapted to be fitted in a patient's femur.

11. A prosthesis to be substituted for the coxo-femoral joint, comprising a hollow head made of Stellite and including a substantially spherical cap and a member closing same, a cellular elastic damping filling of silicone rubber for said head to provide a yielding fitting of the cap over the closing member and to oppose the stresses exerted on the femoral head, and a shaft rigid with the closing member and adapted to be fitted in a patient's femur.

12. A prosthesis to be substituted for the coxo-femoral joint, comprising a hollow head made of Stellite and including two spherical caps the edge of the lower cap being fitted slidingly with a very slight clearance inside the edge of the upper cap, an outer flange rigid with the lower cap at a short distance from its edge to limit the engagement of the lower cap inside the upper cap, a spider-shaped spring including radial arms rigid with the inner periphery of the lower cap and the central portion of which engages the central inner part of the upper cap of said head to provide a yielding fitting of the upper cap over the lower cap and to oppose the stresses exerted on the femoral head, and a shaft rigid with the lower cap and adapted to be fitted in a patient's femur.

13. A prosthesis to be substituted for the coxo-femoral joint, comprising a hollow head made of Stellite and including two spherical caps the edge of the lower cap being fitted slidingly with a very slight clearance inside the edge of the upper cap, an outer flange rigid with the lower cap at a short distance from its edge to limit the engagement of the lower cap inside the upper cap, an inner projection rigid with the central portion of the upper cap, a spider-shaped spring including radial arms rigid with the inner periphery of the lower cap and the central portion of which engages the inner projection of the upper cap of said head to provide a yielding fitting of the upper cap over the lower cap and to oppose the stresses exerted on the femoral head, and a shaft rigid with the lower cap and adapted to be fitted in a patient's femur.

14. A prosthesis to be substituted for the coxo-femoral joint, comprising a hollow head made of Stellite and including a substantially spherical cap and a member closing same, an elastic damping filling for said head to provide a yielding fitting of the cap over the closing member and to oppose the stresses exerted on the femoral head, and an elongated shaft including a tapering dagger-shaped body having a cross-shaped cross-section and adapted to be fitted in a patient's femur, an anchoring ridge projecting alongside the upper section of said body, a plate rigid with the upper end of the shaft body, the upper surface of which is engageable by a tool and the perfectly flat lower surface of which is adapted to be engaged by a surgically cut section of the patient's femoral neck, and an outwardly threaded projection rigid with the upper surface of the plate and threadedly engaging the closing member.

15. A prosthesis to be substituted for the coxo-femoral joint, comprising a hollow head made of Stellite and including a substantially spherical cap, a closing plate, an upstanding ring rigid with said plate slightly on the inside of the periphery of the latter and fitted slidingly inside the edge of the cap, an elastic damping filling for said head to provide a yielding fitting of the cap over the closing member and to oppose the stresses exerted on the femoral head, and a short shaft rigid with the closing plate and adapted to be fitted in a patient's femur.

16. A prosthesis to be substituted for the coxo-femoral joint, comprising a hollow head made of Stellite and including a substantially spherical cap, a closing plate, an upstanding ring rigid with said plate slightly on the inside of the periphery of the latter and fitted slidingly inside the edge of the cap, an elastic damping filling for said head to provide a yielding fitting of the cap over the closing plate and to oppose the stresses exerted on the femoral head, and a short, substantially rectilinear shaft including a tapering end slightly incurved in a vertical plane, the cross-section of said shaft having a rounded section facing the direction of incurvation of the incurved end and a sharp section on the side opposed to the rounded section and the cross-section of the incurved end being that of a cross with sharp outer edges.

References Cited in the file of this patent

FOREIGN PATENTS 1,099,519     France _____ Sept. 6, 1955